Figure 3:
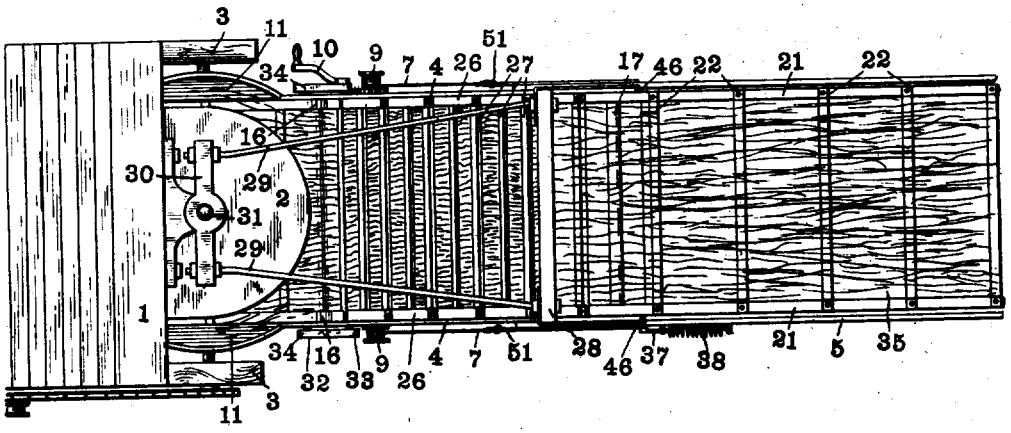

M. HEINEKE.
STRAW STACKER.
APPLICATION FILED SEPT. 27, 1902.
Reissued Feb. 4, 1913.
13,522.
2 SHEETS—SHEET 1.
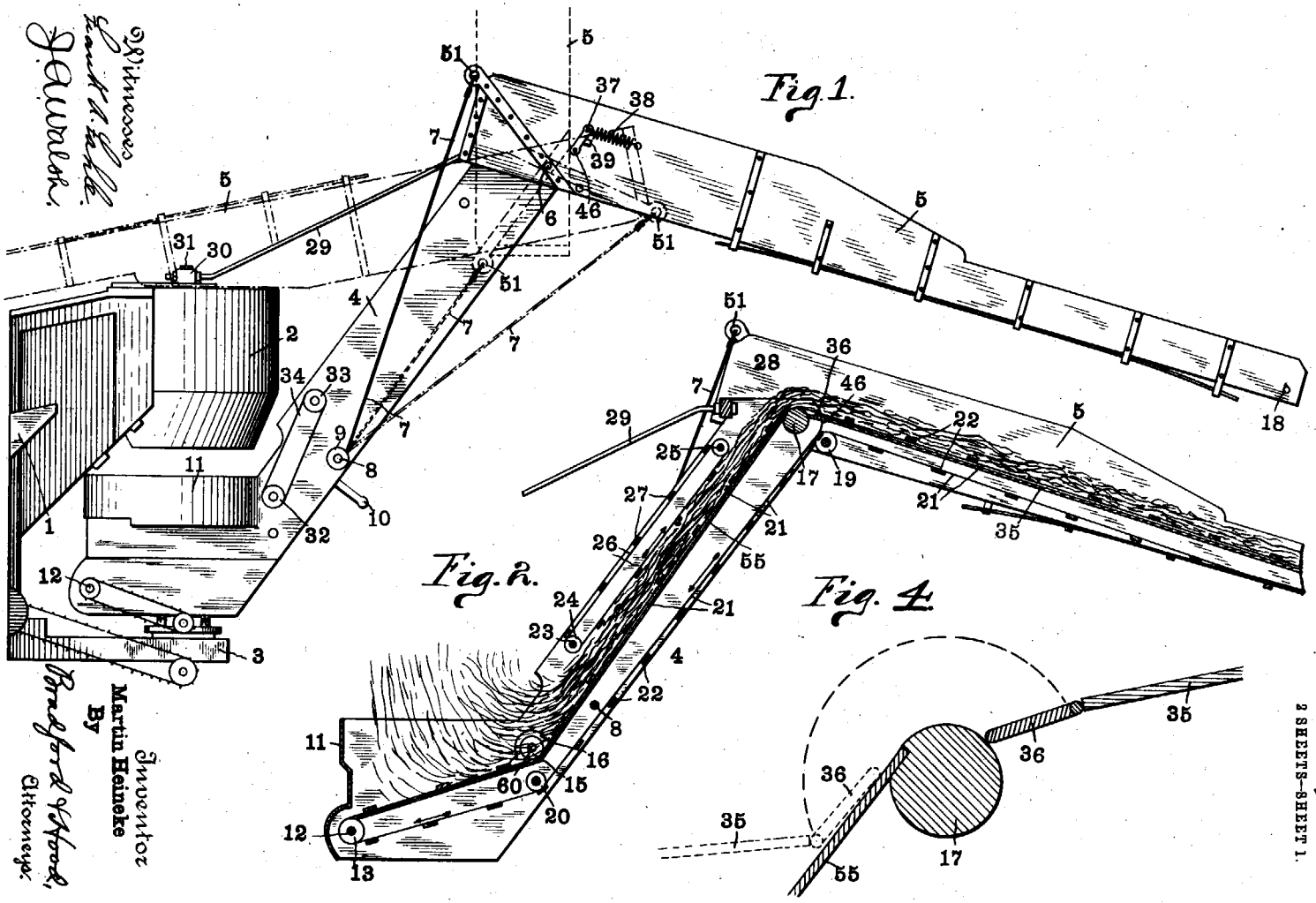
Witnesses
Frank A. Lahle.
J. A. Walsh.
Inventor
Martin Heineke
By
Bradford & Hood,
Attorneys.
COLUMBIA PLANOGRAPH CO., WASHINGTON, D. C.

M. HEINEKE.

STRAW STACKER.

APPLICATION FILED SEPT. 27, 1902.

Reissued Feb. 4, 1913.

13,522.

2 SHEETS—SHEET 2.

Witnesses
Frank A. Lahle
J. A. Walsh,

Inventor
Martin Heineke
By
Bradford & Hood,
Attorneys.

COLUMBIA PLANOGRAPH CO., WASHINGTON, D. C.

UNITED STATES PATENT OFFICE.

MARTIN HEINEKE, OF SPRINGFIELD, ILLINOIS, ASSIGNOR, BY MESNE ASSIGNMENTS, TO THE SATTLEY STACKER COMPANY, OF INDIANAPOLIS, INDIANA, A CORPORATION OF MAINE.

STRAW-STACKER.

13,522. Specification of Reissued Letters Patent. Reissued Feb. 4. 1913.

Original No. 618,092, dated January 24, 1899, Serial No. 693,303. Application for reissue filed September 27, 1902. Serial No. 125,058.

*To all whom it may concern:*

Be it known that I, MARTIN HEINEKE, a citizen of the United States, residing at Springfield, in the county of Sangamon and State of Illinois, have invented certain new and useful Improvements in Straw-Stackers, of which the following is a specification.

In the development of the art of stacking straw and the like, as it comes from threshing and similar machines, many varieties of stackers have been produced. It is desirable that the delivery ends of such stackers of the mechanical-carrier type shall maintain as close an approximation as possible to a perpendicular line, in order that the delivery of the material to the stack shall be kept as close to the middle thereof, at all points, as the stack grows in height, as is possible. Stackers which are pivoted at or near the material receiving point, so that the outer or straw delivering ends in being raised and lowered swing on such pivots, cause such delivery ends to depart rapidly from a perpendicular line, and thus occasion considerable manual labor in the building of a properly shaped stack.

A leading object of my invention is to produce a stacker in which the pivotal points shall be so disposed as that the outer or straw delivering end shall depart but moderately from a perpendicular line dropped from said end when the stacker is in its average position.

A further object of said invention is to provide in such a stacker a continuous raddle or carrier running through the several sections from the receiving point to the delivery point, thus avoiding the mechanical complexity incident to the use of several independent raddles or carrier belts.

A further object is to provide in such a stacker, and in combination with such a carrier as stated, a second outer carrier mounted in the upwardly-extending carrier-section and coöperating with the first-named raddle or carrier-belt to compact the straw shortly after it is received by the stacker and assist in carrying it up to the outer pivoted carrier, and means for driving the same.

A further feature consists in making the raddle-floors continuous without interfering with the folding over of the pivoted outwardly-extending carrier-section.

Further objects and features of said invention, as well as a detailed description of the structures and mechanisms by which the various objects are attained, will appear hereinafter.

Figure 5:
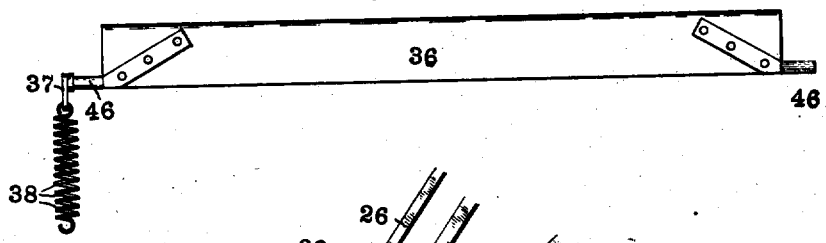
Figure 6:
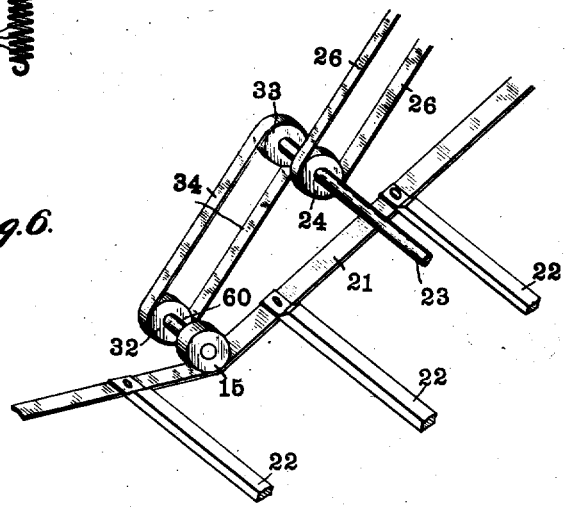

Referring to the accompanying drawings, which are made a part hereof, and on which similar reference characters indicate similar parts, Figure 1 is a side elevation of one variety of straw stacker embodying my invention, as the same appears when attached to or mounted upon the rear end of a threshing machine or separator; Fig. 2 a central vertical sectional view lengthwise of the stacker illustrating the straw-carrying mechanism; Fig. 3 a top or plan view of the principal part of the stacker; Fig. 4 a detail sectional view illustrating the means employed to make the stacker floor continuous during the time the stacker is in use, while permitting one section to be folded back onto the other section; Fig. 5 a detail plan view of the swinging flap forming part of said means; and Fig. 6 a detail in perspective of means employed to transmit motion from the main raddle-belt to the second coöperating carrier of the lower carrier section.

The stacker-frame is composed of two sections 4 and 5, one of which in the arrangement shown is mounted upon a turn-table under the delivery end of the thresher and held at its upper end against vertical swing, while the other is pivoted to swing vertically on and over the upper end of the horizontally-swinging section. The vertically-swinging section has arms, as 51, extending beyond the pivot 6, on which it swings, and lines 7 extend from the arms downward to drums 9 on a shaft 8, which is mounted in bearings carried by the horizontally-moving section. The shaft 8 has a crank-handle 10, by which it is turned, and the handle is preferably geared to the shaft, so as to increase the leverage of the handle, and a detent should be provided in the customary manner to hold the shaft against back motion. The arms 51 are so extended with relation to the pivot of the vertically-swinging section and the location of the drums 9 that when the vertically-swinging section is upright, or approximately so, the connections of the lines with the arms will be between the pivot and the drums. This permits the discharge end of the vertically-swinging section to be raised and lowered to deliver the straw at different heights, and it also enables the section to be swung over onto the deck of the thresher. To effect the result last named, the drums are turned in a direction to raise the vertically-swinging section, and when it is nearly vertical its motion is accelerated until sufficient momentum is developed to carry it over the pivot. It is then permitted to descend to the deck of the thresher, controlled in its descent by the crank, the drums, and the lines, and when it is desired to put it into use again the operation of raising and lowering is reversed. In this case the drum is placed at the proper position to swing the upper section of the stacker past a vertical line rising from its pivot; but it is obvious that if a pulley were placed where the drum is the drum might be located at almost any point on the lower section or elsewhere. It is essential that the line be guided in the direction the arm points when the upper section is approximately vertical; but it is not essential that the drum act as the guide.

In Fig. 1 one of the operative positions of the vertically-swinging section is shown in solid lines, the vertical position is shown in dotted lines, and the position on the deck of the thresher is shown in broken lines.

The form of the raddle preferably employed in the stacker necessitates the use of a floor in each of the sections, and it is a part of my invention to make the floors continuous without interfering with extreme backward swing of the vertically swinging section. To accomplish this result, I provide a circular bearing 17 at the upper end of the floor 55 of the horizontally-swinging section, concentric with the pivot of the vertically-swinging section, and place the floor of the vertically-swinging section tangential to the circular bearing, but out of contact therewith. In the narrow space between the circular bearing-surface and the floor of the vertically-swinging section I place a swinging flap 36. The flap has pivot-pins 46 on its ends in line with one of its edges, and such pins are pivoted adjacent to the end of the floor of the vertically-swinging section in such manner that the swinging edge of the flap extends nearly to the circular bearing and completes the continuity of the floor. The swinging edge of the flap points normally toward the center of the circle of the bearing-surface, or approximately so, and it is narrow enough to swing past such surface when occasion demands. On the outer end of one of the pivot-pins of the flap is fixed an arm 37, which is held against a stop 39 by a spring 38, as shown in Fig. 1, and under these conditions the flap maintains the relative position shown in Fig. 2 and in solid lines in Fig. 4. As the vertically-swinging section is swung over onto the deck of the thresher the adjacent edge of the flap encounters the floor of the horizontally-swinging section, which is also tangential to the circular bearing-surface, and swings backward against the stress of spring 38 to the position shown in broken lines in Fig. 4. In swinging the vertically-swinging section back to an operative position the flap is carried back to its normal space-bridging position by spring 38, and the stop 39 prevents motion to a farther extent.

The carrier portion of the horizontally-swinging section extends obliquely upward to a point above the deck of the thresher, so that the long pivoted carrier-section can freely fold over into its position of rest, and its lower end diverges horizontally. A hopper 11 is formed in the upper surface of the horizontal extension to receive straw from the thresher. A material guide or deflector 2 is built onto the discharge end of the thresher 1, and the stacker is supported on a turn-table carried by extensions 3 of the sills of the thresher. A cross-bar 30 is pivoted at 31 to the upper surface of the thresher in a line coincident with the axis of the turn-table, and rods 29 extend from the cross-bar to a bar 28 in the upper end of section 4 and hold such section against vertical swing, while permitting free horizontal motion.

The raddle or drag is composed of belts, as 21, having cross-slats, as 22, the ends of which are thinned at their connections with the belt to enable both surfaces of the belt to run around pulleys. A preferred form is shown in detail in my Patent No. 661,607. The raddle runs around pulleys 13 on the drive-shaft 12, crosses the hopper portion of the stacker and runs under guide pulleys 15 and upward above floor 55 to the circular bearing 17. From there it runs over flap 36 and floor 35, turns around pulleys on shaft 18 at the end of the vertically-swinging section, runs backward under floor 35, passes over pulleys 19 near the pivot of the sections, and runs downward and under pulleys 20 to the drive-shaft. The raddle is driven from the thresher by any of the well-known gearings that permit horizontal swing, and the pulleys 15 inside the hopper have housings 16 to protect them from the straw.

To aid in starting the straw up the somewhat steep incline of the horizontally-swinging section and to compress it, so that it will carry easier and without scattering, I place a secondary raddle or underdraft drag above the main raddle, as shown in Fig. 2. This drag is preferably composed of belts 26 and cross-slats 27. It runs around rollers 24 and 25, and it is driven in this instance from the guide-pulleys 15 in a manner shown in detail in Fig. 6. The pulleys 15 have short shafts 60 journaled in the side walls of the stacker. Pulleys 32 are fixed onto the protruding ends of the short shafts, and belts 34 connect pulleys 32 with pulleys 33 on the ends of shaft 23 of pulleys 24.

The guide-pulleys 15 are driven forward by the backward motion of the main raddle-belts, and the direction of motion thus attained is just what is needed to give the under run of the carrier or drag the required backward motion.

Having thus fully described my said invention, what I claim as new, and desire to secure by Letters Patent, is—

1. In a stacker, the combination of a horizontally-swingable section held against vertical swing and having a straw-receiving hopper in its lower end, a vertically-swingable section pivoted to the upper end of the lower section, means for swinging the upper section on its pivot, and a raddle running through the sections and across the hopper, substantially as set forth.

2. In a stacker, the combination of a horizontally-swingable section held against vertical swing and having a straw-receiving hopper in its lower end, a vertically-swingable section pivoted to the upper end of the lower section, means for swinging the upper section on its pivot, a raddle running through the sections and across the hopper and an underdraft drag over the raddle adjacent to the hopper, substantially as set forth.

3. In a stacker, the combination of two sections one pivoted to swing vertically on the other, a circular bearing concentric with the pivot, floors in the sections tangential with the circular bearing-surface, one of the floors being separated from such surface, and a spring-controlled flap pivoted to swing in the space, substantially as set forth.

4. In a stacker, the combination with the hinged sections the floors and the circular bearing, of the flap hinged adjacent to an end of one of the floors with its opposite edge presented toward the circular bearing, the arm on the pivot-pin of the flap, the stop to rigidly prevent motion in one direction and the spring to yieldingly resist motion in the opposite direction, substantially as set forth.

5. In a stacker, the combination of an upward-extended stacker-section having an upward-presented hopper in its lower end, a raddle running across the hopper and upward through the stacker-section, guide-pulleys at the upward turn of the raddle-belts, a drag-belt over the raddle adjacent to the hopper, and connections between the guide-pulleys and the pulleys of the drag-belt, whereby the drag-belt is driven from the guide-pulleys, substantially as set forth.

6. The combination of a thresher having a discharge guide for the threshed straw, of a stacker comprising a horizontally swingable frame pivotally connected with the thresher by widely separated vertical pivots having an unobstructed space between them for rearward movement of the straw, one pivot being above the discharge guide and the other pivot being below it, means for rigidly holding the upper part of the said swingable frame from movement toward the upper pivot, straw carrying means horizontally swingable as a whole with the said frame and arranged to continuously receive straw from the discharge of the thresher and deliver it at the rear end of the stacker, the carrying means comprising an upwardly inclined rearwardly extending section and an outer section adjustable in vertical planes, and means for adjusting the outer section relative to the upwardly inclined rearwardly extending section.

7. The combination with a thresher provided at its rear end with a guide for delivering the threshed straw in a downward direction, of a stacker mechanism comprising a horizontally swingable frame or section having a substantially horizontal portion arranged directly below the straw guide of the thresher and connected to the thresher by a vertical pivot, an upwardly inclined rearwardly extending portion connected with the said horizontal portion so as to prevent horizontal movements relative thereto, a brace member connected with the thresher by a vertical pivot arranged directly above the discharge of the thresher and rigidly connected with the upper part of the upwardly inclined rearwardly extending portion so as to prevent relative horizontal movements of the said brace and connected portion of the stacker, an outer section connected with the upper end of the inclined portion of the stacker by a horizontal pivot, means for adjusting the outer section in vertical planes, and carriers arranged to continuously receive the straw from the thresher in the horizontal portion of the swingable frame and continuously convey it therefrom up the inclined section and to the outer discharge end of the outer section.

8. The combination with a thresher arranged to deliver the threshed straw at its outer end, of an attached stacker connected with the thresher on a vertical axis, whereby it is free to be vibrated horizontally and comprising a relatively short rearwardly extending inner stacker section arranged to receive the straw near the bottom of the thresher, a stacker section steeply inclined upward from the outer end of said inner section and rigidly attached thereto and a relative long outer section connected by a horizontal pivot with the upper end of the inner section, near the level of the top of the thresher and means for adjusting the outer section in vertical planes when projecting rearward from the inner section, the outer section being also foldable forward so as to rest upon the thresher when not in use.

9. In a stacker, the combination of a lower section extending upwardly, means comprising a positive brace member for holding said section rigidly from upward or downward movement, vertical pivots arranged respectively near the bottom and near the top of said section and in vertical line with each other on which pivots the section may swing horizontally, an upper section pivoted on the lower section near the top of the latter and arranged to swing upward and downward thereon, and straw carrying means on said sections, substantially as set forth.

10. In a stacker, the combination of a lower section extending upwardly from the rear end of a thresher, a frame member connecting the said section with the thresher for holding the section from upward or downward movement during its lateral oscillation, vertical pivots arranged respectively near the bottom and near the top of the said section on which pivots the section may swing horizontally, an upper section pivoted on the lower section near the top of the latter and arranged to swing upward and downward thereon, and straw carrying means on said sections, substantially as set forth.

11. In a stacker, the combination of a lower section extending upward, means for holding the said section in such position and permitting its lateral swinging comprising vertical pivots in vertical line with each other and a positive brace member between the upper pivot and the said lower section, a relatively long upper section pivoted to the upper end of the lower section to swing vertically upward, and downward below the line of the lower section to distribute the straw near the ground, means for adjusting and holding the upper section on its pivot and straw carrying means on the said sections, substantially as set forth.

12. In a stacker, the combination of a lower section extending steeply upward to a height near the top of the thresher, means for holding the said section in such position comprising a vertical pivot on which the section may swing laterally, a relatively long upper section pivoted to the upper end of the lower section to swing vertically upward, and downward below the line of the lower section to distribute the straw near the ground, and forward to fold over the thresher, means for adjusting the upper section on its pivot, straw carrying means on the said sections, and supplemental conveying means arranged near the steep lower section and coöperating with the straw carrying means thereof to hold the straw thereon while it is being carried, substantially as set forth.

13. The combination of a thresher provided at its rear end with an opening for the delivery of the threshed straw, an oscillatory straw stacker mounted at the rear of the thresher with its lower inner end below said opening, and having separated vertical supporting pivots one above said opening and one below said opening, frame devices extending from the said stacker to the upper supporting pivot and acting to brace the upper part of the stacker from movement toward the thresher, and a straw diverter arranged to prevent rearward movement of the straw and to direct the same downward and mounted at the rear of said opening below the upper of said pivots and above the lower of said pivots, substantially as set forth.

In witness whereof, I have hereunto set my hand and seal at Indianapolis, Indiana, this nineteenth day of September, one thousand nine hundred and two.

MARTIN HEINEKE. [L. S.]

Witnesses:
CHESTER BRADFORD,
JAMES A. WALSH.

Copies of this patent may be obtained for five cents each, by addressing the "Commissioner of Patents, Washington, D. C."